United States Patent Office 3,230,122
Patented Jan. 18, 1966

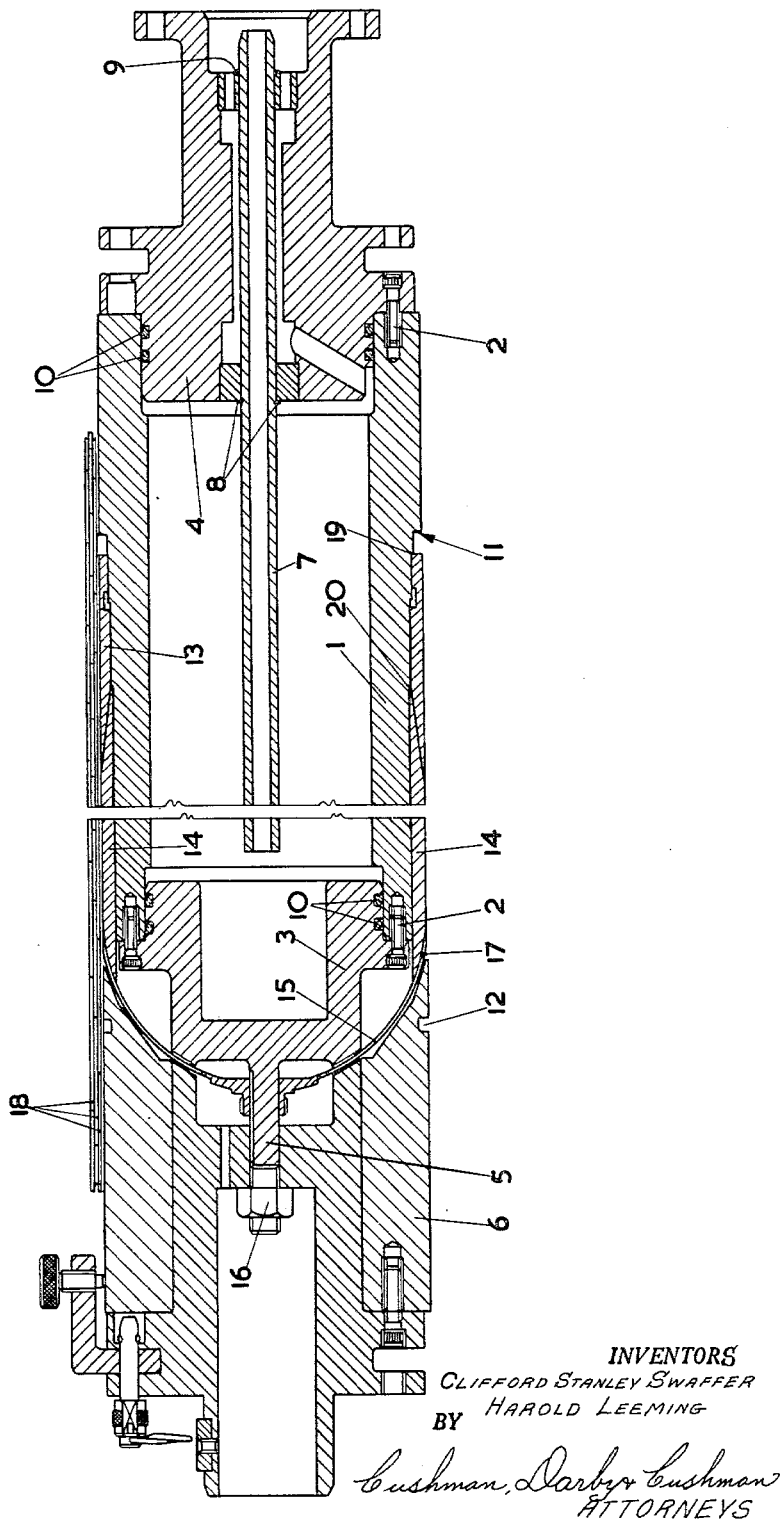

3,230,122
METHOD OF MAKING A TUBULAR
PRESSURE VESSEL
Clifford Stanley Swaffer, Hartlebury, near Kidderminster, and Harold Lemming, Broadwaters, Kidderminster, England, assignors to Imperial Chemical Industries Limited, London, England, a corporation of Great Britain
Filed Feb. 10, 1961, Ser. No. 88,576
Claims priority, application Great Britain, Feb. 12, 1960, 5,191/60
3 Claims. (Cl. 156—187)

This invention relates to rocket motor and other pressure vessels having an opening in at least one end which must withstand very high internal pressures when in use, and which are generally tubular. The invention is particularly concerned with such casings made by a method comprising winding a plurality of layers of metal strip about if desired a collapsible mandrel in helical form, each layer being coated with adhesive and the layers being arranged so that the abutting edges of each layer are covered by a successive layer or layers, causing the adhesive to set, removing the mandrel from the casing, which will hereinafter be referred to as "of the kind referred to."

In accordance with the present invention a method of making a pressure vessel having an opening in at least one end of the kind referred to in which at least one end cap, reinforcing ring or closure is mounted upon a dismountable mandrel prior to winding on the layers of metal strip and in which at least one layer of metal strip is wound about the bonding surface provided for each cap, ring or closure.

Whilst it is preferred to trim the end or ends of the tubular portion of the thus produced pressure vessel before removing the mandrel, the converse is possible.

When the adhesive is of a thermosetting nature as may be when certain synthetic resins are used, for example epoxy resins, the mandrel employed may be constructed so as to permit the circulation of heated fluid in its interior.

The method of the invention will now be described with reference to the accompanying drawing illustrating an axial section through a dismantlable mandrel showing part of a pressure vessel assembled thereon.

In the drawing, the dismountable mandrel comprises a tubular part 1 secured by bolts 2 to two end blocks 3, 4 which spigot into the mandrel. End block 3 has an axially projecting threaded spigot 5 by means of which it is secured to a coaxial clamping member 6.

The latter and end block 4 are adapted to be journalled in a winding machine to permit rotation of the assembly about its axis.

End block 4 is bored axially and a steam pipe 7 extends through the bore and into the mandrel 1. The pipe is secured in position and sealed by rings 8, 9, and sealing rings 10 prevent escape of steam from the mandrel interior past the end blocks.

The external face of the mandrel is provided with three annular steps at 11, 19 and 20 and member 6 has an annular groove 12 in its outer face.

To build the tubular portion of the pressure vessel on the dismountable mandrel, a reinforcing ring 13 which is cylindrical but of tapering section is placed on the mandrel in the position shown, abutting step 19. A number of longitudinal segments 14 is then placed upon the mandrel 1 with tapering ends of the segments making joints with the ring 13 and abutting step 20, and an end cap or closure 15 of domed shape having a central hole is placed over the opposite ends of the longitudinal segments and end block 3 with spigot 5 projecting through the central hole in the cap 15.

Member 6 is then located in position and held in place by a nut 16; this clamps the cap 15 in position and as the skirt 17 of the latter surrounds the segments 14 the whole assembly thus far is held together between block 4 and block 6.

This assembly is then mounted in a winding machine, exposed faces of the thus formed dismantlable mandrel which are to be wound with strip are coated with a parting agent, the longitudinal segments are covered with a film of synthetic resin such as a polyester resin, the outer surfaces of the ring 13 and the skirt of the cap 17 are degreased, and the assembly is then heated with steam to a desired temperature.

A coat of liquid adhesive such as an expoxy resin is then applied to the skirt 17 of the cap 15 and to the outer face of the ring 13 and a number of layers of steel strip 18, interposed with layers of the adhesive, are wound on to the assembly with edges of each layer abutting and successive layers arranged in a predetermined pattern and all being wound in the same sense, the layers extending beyond the groove 12 and step 11 as shown in the drawing.

After winding the sheet strip 18, the adhesive is heated to cause it to set or cure. If desired, heating such as infrared radiant heating applied from an external source may be used.

The whole assembly is then cooled and the ends are trimmed by applying cutting tools to the wound strip at the position of the groove 12 and at a further groove formed between the step 11 and the adjacent end of the ring 13. The assembly is then dismantled by releasing nut 16, removing member 6, withdrawing the mandrel 1 with the end blocks 3, 4 from the pressure vessel and longitudinal segments 14, and removing the longitudinal segments piecemeal.

Because of steps 19 and 20, and segments 14 of predetermined length, it is possible to assemble pressure vessels accurate in dimensions to within small limits without using highly skilled labour. Moreover, the whole operation is carried out on one set of tools which leads to reduced costs and the joints between the ring 13, winding 18 and cap 15 are inherently of great strength.

We claim:
1. A method of making a tubular pressure vessel from a flat metal strip, a skirted cap and a generally cylindrical reinforcing ring, said pressure vessel being open at least at one end, said method comprising the steps of: supporting the reinforcing ring upon a mandrel with its outer surface substantially flush with the exposed outer surface portions of the mandrel on either side thereof; axially clamping the skirted cap against one end of the mandrel with the outer surface of the skirt of the cap forming a continuation of the outer surface of the mandrel and of the outer surface of the ring; coating exposed surfaces of the mandrel with a parting agent; degreasing outer surfaces of the skirt of the cap and the reinforcing ring and then applying an adhesive to the degreased surfaces, applying an adhesive to the flat metal strip; helically winding in the same direction layers of the flat metal strip about the skirt of the cap, reinforcing ring and mandrel with the edges of each helix in a layer abutting with edges of adjacent helixes of the same layer and the abutting edges of one layer being covered by a successive layer, the layers of strip being continued past the skirt of the cap in an axial direction; setting the adhesive and then removing the formed tubular vessel from the mandrel.

2. A method as defined in claim 1 including trimming the ends of the layers of the formed vessel which extend axially beyond the skirt of the cap before the same is removed from the mandrel.

3. A method as defined in claim 1 including utilizing a thermosetting adhesive on the cap, reinforcing ring and flat metal strip; and applying a heated fluid at least interiorly of the formed tubular vessel while the same is on the mandrel to cause setting of the adhesive.

References Cited by the Examiner

UNITED STATES PATENTS

| | | | |
|---|---|---|---|
| 1,800,360 | 4/1941 | Schroeder | 156—191 |
| 2,401,625 | 6/1946 | Eger | 156—191 |
| 2,479,828 | 8/1949 | Geckler | 156—173 |
| 2,557,932 | 5/1951 | Baymiller | 156—425 XR |
| 2,603,579 | 7/1952 | Kramer | 156—446 |
| 2,678,677 | 5/1954 | Hervey et al. | 156—446 |
| 2,723,705 | 11/1955 | Collins | 156—195 |
| 2,731,070 | 1/1956 | Meissner | 156—143 |
| 2,744,043 | 5/1956 | Ramberg | 60—39.69 |
| 2,748,805 | 6/1956 | Winstead | 156—195 |
| 2,762,419 | 9/1956 | Prewitt | 156—189 |
| 2,817,484 | 12/1957 | Stenzel | 60—35.6 |
| 2,837,456 | 6/1958 | Parilla | 156—195 |
| 2,844,939 | 7/1958 | Schultz | 60—35.6 |
| 2,964,209 | 12/1960 | Eddy | 60—35.6 |
| 3,044,256 | 7/1962 | Bayly et al. | 60—35.6 |

EARL M. BERGERT, *Primary Examiner.*

SAMUEL FEINBERG, G. L. PETERSON, P. DIER,
*Assistant Examiners.*